US012014604B2

(12) United States Patent

Tricarico, Jr.

(10) Patent No.: US 12,014,604 B2

(45) Date of Patent: Jun. 18, 2024

(54) TOURNAMENT SYSTEM FOR MEMES AND OTHER INTERACTIVE MEDIA

(71) Applicant: William Roy Tricarico, Jr., Las Vegas, NV (US)

(72) Inventor: William Roy Tricarico, Jr., Las Vegas, NV (US)

( * ) Notice: Subject to any disclaimer, the term of this patent is extended or adjusted under 35 U.S.C. 154(b) by 0 days.

(21) Appl. No.: 17/737,292

(22) Filed: May 5, 2022

(65) Prior Publication Data

US 2022/0358815 A1 Nov. 10, 2022

Related U.S. Application Data

(60) Provisional application No. 63/185,857, filed on May 7, 2021.

(51) Int. Cl.
*G07F 17/32* (2006.01)

(52) U.S. Cl.
CPC ...... *G07F 17/3276* (2013.01); *G07F 17/3244* (2013.01)

(58) Field of Classification Search
CPC .......................... G07F 17/3276; G07F 17/3244
USPC .............................................................. 463/9
See application file for complete search history.

(56) References Cited

U.S. PATENT DOCUMENTS 6,968,243 B1 * 11/2005 Oh ...................... G10H 1/0008 463/40
7,162,433 B1 1/2007 Foroutan
9,881,462 B2 1/2018 McTernan et al.
2007/0233585 A1 * 10/2007 Ben Simon ......... G07F 17/3244 705/35
2008/0172137 A1 7/2008 Safina
2010/0228617 A1 9/2010 Ransom et al.
2011/0319170 A1 12/2011 Shimura et al.
2012/0122564 A1 * 5/2012 Kovacs ............... G07F 17/3272 463/25
2012/0150957 A1 6/2012 Bonchi
2012/0157177 A1 * 6/2012 Hughes .............. G06Q 30/0275 463/9
2013/0204692 A1 8/2013 Mallory et al.
2014/0206449 A1 7/2014 Alman et al.
2015/0126275 A1 * 5/2015 Arnone ............... G07F 17/3276 463/27
2015/0127127 A1 5/2015 Carpenter et al.
2015/0371503 A1 * 12/2015 Arnone ............... G07F 17/3276 463/25
2016/0027260 A1 * 1/2016 Pierce ................. G07F 17/3276 463/7
2018/0147496 A1 * 5/2018 Curtis ................... A63F 13/352
2018/0165919 A1 * 6/2018 Arnone ............... G07F 17/3213

FOREIGN PATENT DOCUMENTS

CN 105744313 A 7/2016

* cited by examiner

*Primary Examiner* — Pierre E Elisca
(74) *Attorney, Agent, or Firm* — John Rizvi; John Rizvi, P.A.—The Patent Professor®

(57) ABSTRACT

A system and method that provides a meme-based tournament for players to compete against each other and awarding prizes to the winning players of the meme-based tournament. The meme-based tournament execution is facilitated by a meme-based tournament platform executing at least a meme-based tournament system app that provides the users access to the meme-based tournament platform on a user device.

20 Claims, 11 Drawing Sheets

1000

| Size (1004) | Entry Fee (1006) | 1st Place (1008) | 2nd Place (1010) | 3rd Place (1012) | 4th Place (1014) |
|---|---|---|---|---|---|
| 16 | 100 | $5 Gift Card | N/A | N/A | N/A |
| 32 (1002) | 200 | $10 Gift Card | $5 Gift Card | N/A | N/A |
| 64 | 300 | $25 Gift Card | $10 Gift Card | $5 Gift Card | N/A |
| 128 | 400 | $50 Gift Card | $25 Gift Card | $10 Gift Card | $5 Gift Card |

1016

FIG. 10

TOURNAMENT SYSTEM FOR MEMES AND OTHER INTERACTIVE MEDIA

CROSS-REFERENCE TO RELATED APPLICATION

This application claims the benefit of U.S. Provisional Application 63/185,857, filed May 7, 2021, which is hereby incorporated by reference herein in its entirety.

FIELD OF THE INVENTION

The present invention relates generally to interactive media and more particularly, to a system and method that provides a meme-based tournament for players to compete against each other and awarding prizes to the winning players of the meme-based tournament.

BACKGROUND OF THE INVENTION

Interactive media normally refers to products and services on digital computer-based systems which respond to a user's actions by presenting content such as text moving images, animation, video, audio, and video games. In essence, interactive media is a medium whereby the output from the media comes from the input of user(s). An internet meme, more commonly known simply as a "meme" is a type of idea, behavior, or style that is spread via the internet, for example, through social media platforms, and is one popular example of interactive media or visual media. Memes may be transmitted in a variety of ways such as person to person via social networks, email, texts, and blogs. Instant communication on the Internet facilitates word of mouth transmission, resulting in fads and sensations that tend to grow rapidly and promote the rapid evolution of memes. As such, a meme can be a virally transmitted image with text, usually providing pointed commentary on cultural symbols, social ideas, and/or current events. Typically, a meme is a photo or video but may also take form as a block of text, and memes serve a cultural shorthand by nature. The memes may relate to various existing Internet cultures (or subcultures) as often created or spread on various websites. One typical trait of Internet memes is the appropriation of a part of broader culture, for instance by giving words and phrases intentional misspellings or using incorrect grammar, and many memes utilize popular culture in image macros of other media. The more a meme is spread, the larger the culture influence that is garnered by the meme. The classification of content as a meme may vary across different communities on the Internet and is subject to change over time. Traditionally, memes consisted of a combination of image macros and a concept, or catchphrase. However, the concept has since become broader and more multi-faceted, evolving to include more elaborate structures such as GIFs, videos, and viral sensations Competitive games are a popular form of entertainment and come in a variety of forms to satisfy the needs of different players. For example, virtual games and gaming techniques provide for distributed electronic tournament systems that allows remotely located players to participate in a variety of tournaments, for example chess, bridge, and poker. Some Internet-based game sites provide a ladder-type ranking system whereby players are ranked according to their individual scores. As such, these electronic tournaments allow players to compete at any time from any place in a virtual environment in order to increase player interest, the providers of such virtual tournaments offer a variety of prizes. Increasing the variety of available competitive virtual gaming to incorporate aspects of interactive media and/or memos would be of great benefit to players and the suppliers of virtual gaming.

Accordingly, there is need for a technique that incorporates aspects of interactive media and/or memes that provides a meme-based tournament for players to compete against each other and awarding prizes to the winning players of the meme-based tournament.

SUMMARY OF THE INVENTION

The present invention is directed to providing a system and method that provides a meme-based tournament for players to compete against each other and awarding prizes to the winning players of the meme-based tournament.

In a first implementation of the invention, a meme-based tournament system is provided comprising a meme-based tournament cloud that further comprises at least one or more servers and databases for delivering a meme-based tournament to a plurality of users (i.e., players and/or sponsors) that compete against each other and awarding prizes to the winning players of the meme-based tournament. The meme-based tournament execution is facilitated by a meme-based tournament platform executing at least a meme-based tournament system app that provides the users access to the meme-based tournament platform using, illustratively, the meme-based tournament system application executing on a user device. The meme-based tournament platform and/or the user device each further comprising: a processor; and a memory storing instructions that when executed cause the processor to perform operations comprising; (i) offering a meme-based tournament, the meme-based tournament having a specific theme and a select number of entries competing in a select number of rounds, (ii) identifying a plurality of players for competing in the meme-based tournament; (iii) receiving a plurality of memes for use in competing in the meme-based tournament from the plurality of players identified, each meme of the plurality of memes associated with a particular one player of the plurality of players identified for competing in the meme-based tournament; (iv) executing the meme-based tournament until the select number of rounds are exhausted and identifying a particular one meme of the plurality of memes, and (v) awarding a prize to at least the player associated with the particular one meme of the plurality of memes identified.

In a second aspect, a method is provided that facilitates the delivery of meme-based tournament that provides a meme-based tournament for players to compete against each other and awarding prizes to the winning players of the meme-based tournament. The method comprising (i) offering a meme-based tournament, the meme-based tournament having a specific theme and a select number of entries competing in a select number of rounds; (ii) identifying a plurality of players for competing in the meme-based tournament; (iii) receiving a plurality of memes for use in competing in the meme-based tournament from the plurality of players identified, each meme of the plurality of memes associated with a particular one player of the plurality of players identified for competing in the meme-based tournament; (iv) executing the meme-based tournament until the select number of rounds are exhausted and identifying a particular one meme of the plurality of memes; and (v) awarding a prize to at least the player associated with the particular one meme of the plurality of memes identified.

In a third aspect, a meme-based tournament system application (alternatively referred to herein as an "app") may be executed on the meme-based tournament platform and/or the user device for executing the method operations that provides the meme-based tournament for players to compete against each other and awarding prizes to the winning players of the meme-based tournament.

In a fourth aspect, the meme-based tournament system app may be a mobile application executing on a mobile device and wherein the mobile device may be a smartphone, laptop computer, tablet and/or wearable device.

In another aspect, there is creating and hosting, by a meme-based tournament platform, the meme-based tournament offered.

In another aspect the prize awarded has a monetary value.

In another aspect, the prize awarded has a non-monetary value.

In another aspect, there is earning one or more tokens by at least one player of the plurality of players identified for the competing in the meme-based tournament executed.

In another aspect, there is receiving a designation for the prize awarded comprising at least a prize type and a prize value.

In another aspect, the meme-based tournament is a knock-out-style tournament comprising a bracket-style configuration having a plurality of brackets.

In another aspect, the bracket-style configuration is one of: sixteen (16) players, thirty-two (32) players, sixty-four (64) players, one hundred twenty-eight (128) players, two hundred fifty-six (256) players, five hundred twelve (512) players, one thousand twenty-four (1024) players, and two thousand forty-eight (2048) players.

In another aspect, there is receiving a specific time designation for the executing of the meme-based tournament.

In another aspect, each judge of the plurality of judges applies a specific judging criteria in the judging of the plurality of memes.

In another aspect, there is creating and hosting, by an individual user using a meme-based tournament platform, the meme-based tournament offered.

In another aspect, there is purchasing, by the individual user, a plurality of tournament host tokens.

In another aspect, there is receiving, by the meme-based tournament platform, at least one tournament host token from the individual user as payment for the creating, offering, and executing of the meme-based tournament.

In another aspect, there is defining the meme-based tournament as a function of at least a tournament size, a theme, a defined meme set for selection by the plurality of players, an entry fee, and a prize structure.

In another aspect, the meme-based tournament's theme is one of politics, sports, entertainment, and current events.

In another aspect, there is selecting particular ones of a plurality of individual users associated with a meme-based tournament platform to serve as the plurality of judges; and inviting the particular ones of the plurality of individual users selected to serve as the plurality of judges.

In another aspect, each judge of the plurality of judges is given a defined time limit for the judging of a particular match between individual memes competing in the meme-based tournament in a particular bracket of the plurality of brackets.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 10 presents an illustrative meme-based tournament entry fee and prize configuration for use with the meme-based tournament system of FIG. 1 in accordance with an embodiment.

Like reference numerals refer to like parts throughout the several views of the drawings.

DETAILED DESCRIPTION

Figure 1:
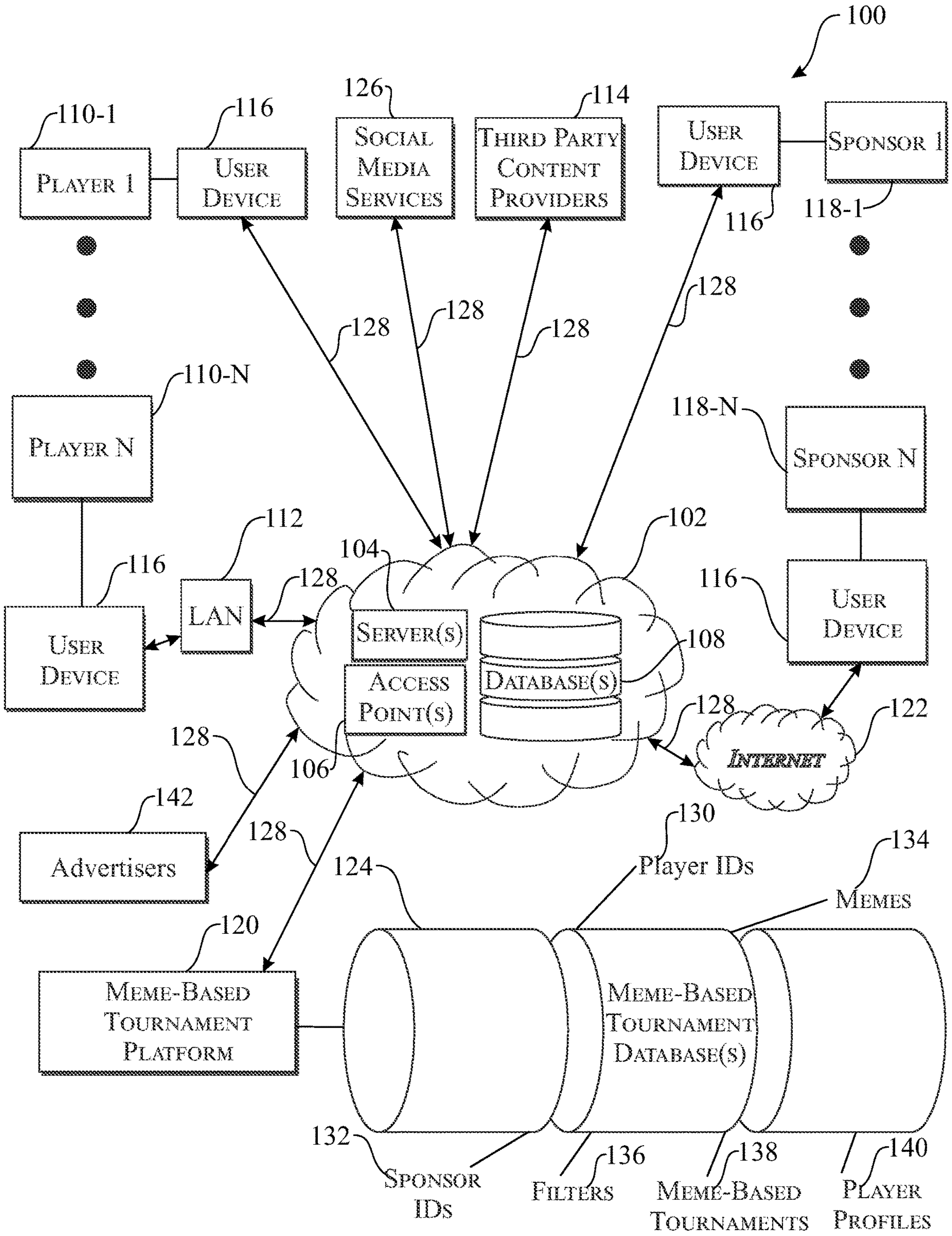
FIG. 1 presents a high-level block diagram of a meme-based tournament system comprising a meme-based tournament cloud for providing a meme-based tournament platform in accordance with an embodiment.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in the Figures herein. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a system and method that provides a meme-based tournament for players to compete against each other and awarding prizes to the winning players of the meme-based tournament. Illustratively, the meme-based tournament has a specific theme and a select number of entries competing in a select number of rounds and a plurality of players are identified for competing in the meme-based tournament. A plurality of memes is received for use in competing in the meme-based tournament from the plurality of players that are competing wherein each meme of the plurality of memes associated with a particular one player of the plurality of players identified for competing in the meme-based tournament. The meme-based tournament is executed until a select number of rounds are exhausted and identifying a particular one meme of the plurality of memes (e.g., the "winner"). Illustratively, the execution of the meme-based tournament includes a plurality of judges that judge the individual rounds and vote for their favorite meme thereby advancing memes until a single winning meme is identified. The player(s) associated with the winning meme (s) are awarded prizes by the system. Notably, the "prizes" awarded in the accordance with the principles of the disclosed embodiments may have a monetary value (e.g., a $100 gift card) or a non-monetary value. That is, the prizes awarded are not restricted in any way and may be whatever the tournament sponsor designates as the prize to be awarded.

FIG. 1 presents a high-level block diagram of meme-based tournament system 100 for providing a meme-based tournament platform 120 for executing a meme-based tournament in accordance with an embodiment. As shown for instance in FIG. 1, the meme-based tournament system 100 includes meme-based tournament cloud 102 comprising at least server(s) 104, access point(s) 106 and database(s) 108. As will be detailed herein below, the meme-based tournament cloud 102 facilitates the delivery of meme-based tournaments to users (e.g., a plurality of players comprised by player 1 110-1 through player N 110-N; and a plurality of sponsors comprised by sponsor 1 118-1 through sponsor N 118-N) whereby the plurality of players that are engaged with the meme-based tournament platform 120 will establish individual player profiles (e.g., player profiles 140). The meme-based tournament database(s) 124 may store player IDs 130, sponsor IDs 132, memes 134, filters 136, meme-based tournaments 138 and the player profiles 140. Among other things, the player profiles 140 will hold the individual prize tokens awarded to players, where such awarded tokens may be used by the players to cover entry fees for participation in future meme-based tournaments 138. Notably, the tokens of the disclosed embodiments herein have no "cash value" and are only redeemable for the aforementioned entry fees. Further, other than the token-based entry fees there is no other fee, monetary or otherwise, for players to engage in the meme-based tournaments 138 across the meme-based tournament system 100. Players will also be able to create one or more filters (e.g., filters 136) that will be used to define and find meme-based tournaments of interest to the player. Filters 136 may also be used as a broadcasting method to advertisers 142 and/or the plurality of sponsors with regard to items that may interest a player such that in-app advertisements may be provided, for example. Illustratively, such filters 136 may also define user items such as meme-based tournament sizes, entry fees, prizes, tags, and sponsors. As used herein the term "user" means any person, organization, and/or entity that has engaged with the meme-based tournament platform 120 offered by and through the meme-based tournament system 100 using, for example, a meme-based tournament app, as will be detailed herein below, on the user device 116. The user device 116 provides engaged users (e.g., player 1 110-1 through player N 110-N and/or sponsor 1 118-1 through sponsor N 118-N) with real-time access to and execution of meme-based tournaments in accordance with the disclosed embodiments herein. In terms of tournament hosting (or sponsoring), in accordance with the principles of the disclosed embodiments herein, tournaments may be created and hosted by the meme-based tournament platform 120 itself and/or by individual user (i.e., hosts or sponsors) who will remit a payment (e.g., a one-time lump sum for a single tournament sponsorship or a monthly subscription fee allowing an unlimited number of tournaments to be hosted by the individual sponsor). Also, in addition to tournament tokens (e.g., used as entry fees for tournaments), there are tournament host tokens in accordance with and embodiment. A tournament host token hereunder may be used by an individual user as payment for to create a particular tournament that they wish to sponsor. These tournament host tokens may be procured in a variety of ways including, but not limited to, purchased directly by the user, awarded by the meme-based tournament platform 120 (for example, on a random basis in accordance with a token distribution plan), earning the tokens by the user through an achievement ladder (based on tournament participation results, for example), and/or winning the tokens in one or more tournaments that the user has entered. In the event that a particular user may desire to use tournament host tokens, for example, as prizes for a sponsored tournament then the user will purchase these tournament host tokens using the meme-based tournament platform 120.

Additionally, the plurality of sponsors that are individually subscribed to the meme-based tournament platform 120 will establish individual meme-based tournaments 138 in which the plurality of players may individually compete. Further, the meme-based tournament platform 120 itself may also generate individual meme-based tournaments 138, for example, based on user demand. In this way, the creating and identification of the memes and the generation of meme-based tournaments in which such memes are entered for competition are tied to the practical application of providing a technical benefit to, for example, the meme-based tournament platform 120 through the components thereof, as will be further detailed herein below. For example, meme-based tournaments 138 may be generated by scanning the filters 136 and matching them with current events (e.g., political, social sporting, etc.) and/or popular topics (e.g., movies, music, etc.) that are related thereto. If a particular tournament proves to be extremely popular and in demand, then the meme-based tournament platform 120 will generate more of this tournament type to meet player demand. The individual meme-based tournaments 138 may have a number of attributes such as size, entry fee, prize structure, topic/theme, and tags. For example, if the tournament is a bracket-style tournament the size will typically start at sixteen (16) players and scale up to larger player sizes (i.e., 32, 64, 128, 256, 512, 1024, 2048, etc.) The entry fee and prize structure may or may not correlate with the tournament size. Illustratively, the larger the overall tournament size the larger the number of prizes (e.g., first and second place prizes, or first, second, third and fourth place prizes). Further, while the vast majority of tournaments will have the same or substantially the same prize structure, there may also be tournaments (e.g., large sized) that have a single prize awarded to the first place winner with no other players receiving any prize no matter their tournament placement. Typically, the topic/theme of a particular meme-based tournament will be sourced from current events using any one of a number of well-known online news aggregators (e.g., mediastack.com). The tags are, for example, well-known hashtags that assist with the user searching capabilities for finding meme-based tournaments of interest. Further, tournaments may be scheduled for execution at some future time and provided that the requisite tournament entries have been filled. For example, a 256-sized tournament may begin either at the time the tournament entries (e.g., brackets) are filled completely or at some designated future time after the tournament entries have been filled. If a tournament scheduled for execution in the future does not have the requisite number of entries at the scheduled execution time, then all entry fees may be returned to the affected users, and the tournament host token(s) credited back to the user who created and scheduled the subject future tournament.

As noted above, the meme-based tournament cloud 102 comprises at least the server(s) 104, the access point(s) 106 and the database(s) 108. Cloud, cloud service, cloud server and cloud database are broad terms and are to be given their ordinary and customary meaning to one of ordinary skill in the art and includes, without limitation, any database, data repository or storage media which store content typically associated with and managed by users, meme-based tournaments, meme-based tournament providers, third party content providers, social media services, to name just a few. A cloud service may include one or more cloud servers and cloud databases that provides for the remote storage of content as hosted by a third-party service provider or operator. A cloud server may include an HTTP/HTTPS server sending and receiving messages in order to provide web-browsing interfaces to client web browsers as well as web services to send data to integrate with other interfaces (e.g., as executed on the user device 116). The cloud server may be implemented in one or more well-known servers and may send and receive content in a various forms and formats, user supplied and/or created information/content and profile/configuration data that may be transferred to read from or stored in a cloud database (e.g., the databases 108).

A cloud database may include one or more physical servers, databases or storage devices as dictated by the cloud service's storage requirements. The cloud database may further include one or more well-known databases (e.g., an SQL database) or a fixed content storage system to store content, profile information, configuration information or administration information as necessary to execute the cloud service. In various embodiments, one or more networks providing computing infrastructure on behalf of one or more users may be referred to as a cloud, and resources may include, without limitation, data center resources, applications (e.g., software-as-a-service or platform-as-a-service) and management tools. In this way, in accordance with various embodiments, the users may find and engage in the meme-based tournaments hereunder in a fully transparent fashion without any required understanding of the underlying hardware and software necessary to interface, communicate, manipulate, and exchange information and/or data necessary to deliver such services.

Figure 2:
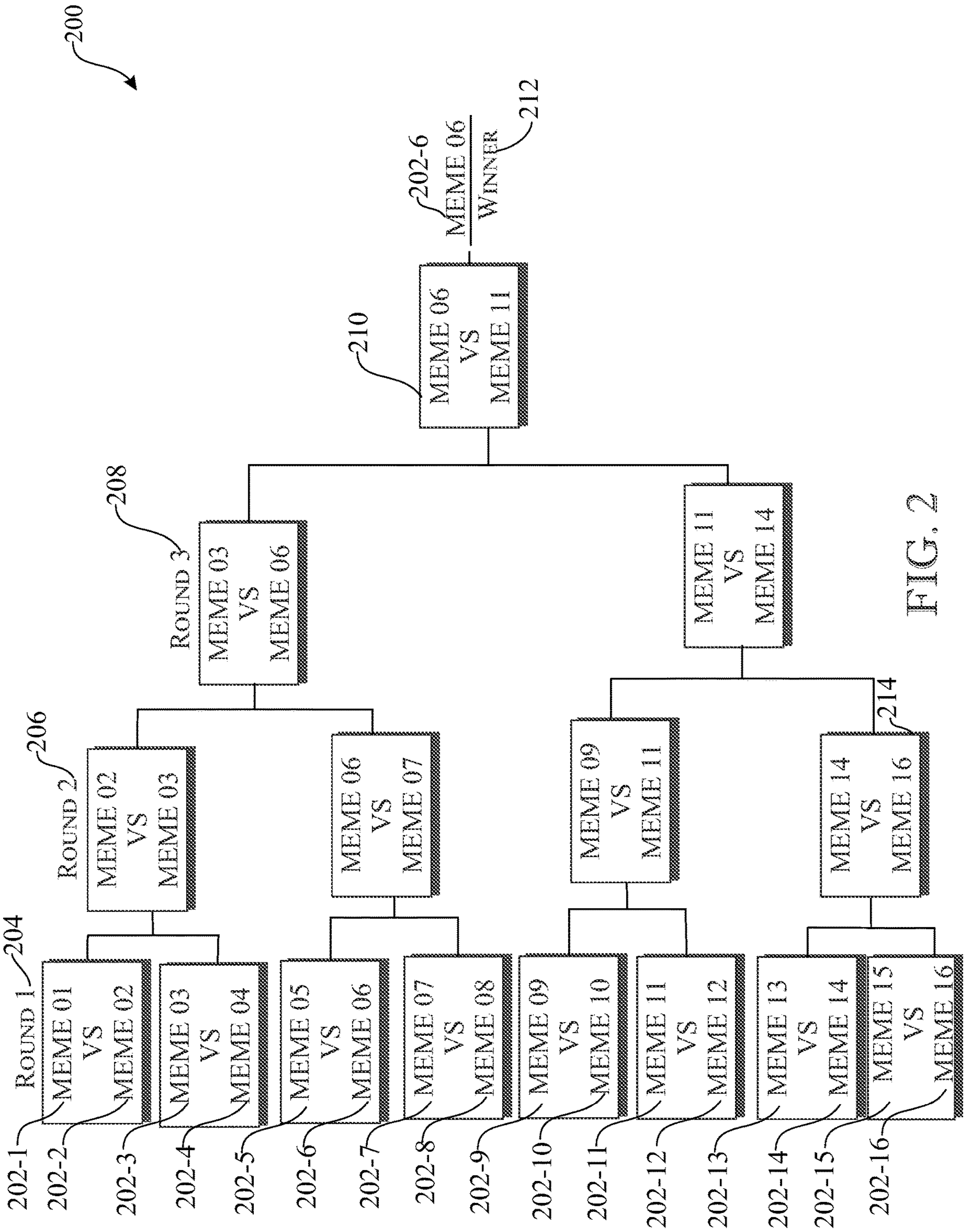
FIG. 2 presents an illustrative meme-based tournament configuration for providing a meme-based tournament in accordance with an embodiment.

Turning our attention briefly to FIG. 2, an illustrative meme-based tournament configuration 200 is presented for providing a meme-based tournament in accordance with an embodiment. More particularly, the meme-based tournament configuration 200 is directed to a so-called bracket or tournament bracket that is represented by a tree diagram 214 that shows a series of games (or matches) played during a knockout-style tournament. Different knockout tournament formats have different bracket configurations with the most common being a single-elimination tournament, as is depicted by the meme-based tournament configuration 200 that shows a 16-player single-elimination tournament with each player being associated with a particular one meme (i.e., meme 202-1, meme 202-2, meme 202-3, meme 202-4, meme 202-5, meme 202-6, meme 202-7, meme 202-8, meme 202-9, meme 202-10, meme 202-11, meme 202-12, meme 202-13, meme 202-14, meme 202-15, and meme 202-16). This tournament type employs 2-player matches (e.g., meme 202-1 vs. meme 202-2) in a first round 204. As the tournament progresses one meme from each match will advance and one will be eliminated. The competition and matches continue through round 2 206, round 3 208, and round 4 210, respectively, until on meme remains and a winner (i.e., winner 212) is determined. In this illustrative example, meme 202-6 has won the tournament and is declared the winner 212. As will be further detailed herein below, the meme-based tournaments hereunder are judged by a plurality of judges (each on an anonymous basis) In addition to a variety of tournament types, it will also be understood that any type of interactive media may be used for executing the tournaments in accordance with the principles of the embodiments including but not limited to memes.

Figure 3:
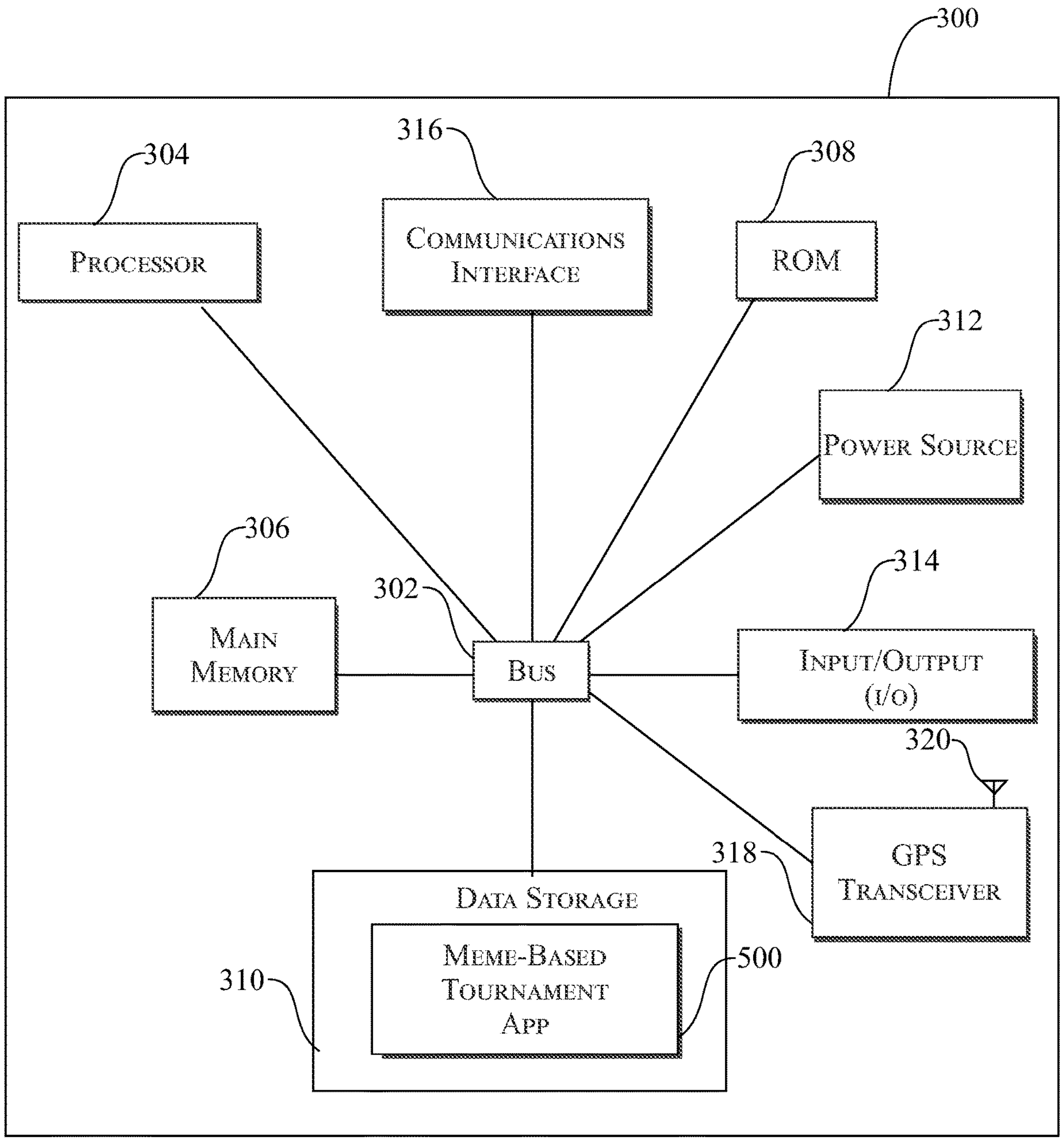
FIG. 3 presents an illustrative user device configured for use with the meme-based tournament system of FIG. 1 in accordance with an embodiment.

Turning our attention to FIG. 3, an illustrative user device 116 configured as mobile device 300 is shown for deployment with the meme-based tournament system 100 of FIG. 1 in accordance with an embodiment. The mobile device 300 typically includes bus 302 and processor 304 coupled to the bus 302 for executing operations and processing information in a well-known manner. As will be appreciated, a "mobile device" in the context herein may comprise a wide variety of devices such as smartphones, laptop computers, tablets, and wearable device, to name just a few, that execute mobile applications in accordance with the principles of the disclosed embodiments herein. For example, the execution of the operations of meme-based tournament system app 500 as will be discussed in much greater detail herein below. The processor 304, as powered by power source 312, may include both general and special purpose microprocessors, and may be the sole processor or one of multiple processors of the device. Further, the processor 304 may comprise one or more central processing units (CPUs) and may include, be supplemented by, or incorporated in, one or more application-specific integrated circuits (ASICs) and/or one or more field programmable gate arrays (FPGAs).

The mobile device 300 may also include main memory 306 coupled to the bus 302 for storing computer-readable instructions to be executed by the processor 304 in a well-known manner. The main memory 306 may also be utilized for storing temporary variables or other intermediate information during the execution of the instructions by the processor 304. The mobile device 300 may also include read-only memory (ROM) 308 or other static storage device coupled to the bus 302. Further, data storage device 310, such as a magnetic, optical, or solid-state device may be coupled to the bus 302 for storing information and instructions for the processor 304 including, but not limited to, the meme-based tournament system app 500. Data storage device 310 and the main memory 306 may each comprise a tangible non-transitory computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

The mobile device 300 may also include one or more communications interface 316 for communicating with other devices via a network (e.g., a wireless communications network) or communications protocol (e.g., Bluetooth®). For example, such communication interfaces may be a receiver, transceiver, or modem for exchanging wired or wireless communications in any number of well-known fashions. For example, the communications interface 316 may be an integrated services digital network (ISDN) card or modem/router used to facilitate data communications of various well-known types and formats. Further, illustratively, the communications interface 316 may be a local area network (LAN) card used to provide data communication connectivity to a comparable LAN (e.g., LAN 112) Wireless communication links may also be implemented. The Global Positioning System (GPS) transceiver 318 and antenna 320 facilitate delivery of location-based services in a well-known manner in order to register the exact location of the user of the user device 116, for example. As will be well understood, the application herein will be able to track individual users and their location upon the launching of the application thereby enabling the well understood GPS location features of the user device (e.g., a smartphone). This will facilitate, illustratively, the hosting of real-time meme-based tournaments amongst players in a specific location (e.g., a bar or sports stadium).

As will be appreciated, the functionality of the communication interface 316 is to send and receive a variety of signals (e.g., electrical, optical, or other signals) that transmit data streams representing various data types. The mobile device 300 may also include one or more input/output devices 314 that enable user interaction with the mobile device 300 (e.g., camera, display, keyboard, mouse, speakers, microphone, buttons, etc.). The input/output devices 314 may include peripherals, such as a camera, printer, scanner, display screen, etc. For example, the input/output devices 314 may include a display device such as a cathode ray tube (CRT), plasma or liquid crystal display (LCD) monitor for displaying information to the user, a keyboard, and a pointing device such as a mouse or a trackball by which the user can provide input to the mobile device 300. As shown, the meme-based tournament system app 500 is executed on the mobile device 300 and it will also be understood that other hardware devices may be used to execute and operate the meme-based tournament system app 500 in any real-time setting. For example, a network-enabled portable tablet computer, a wearable device and/or dedicated portable hardware device may be employed equally in the context of the disclosed embodiments.

Figure 4:
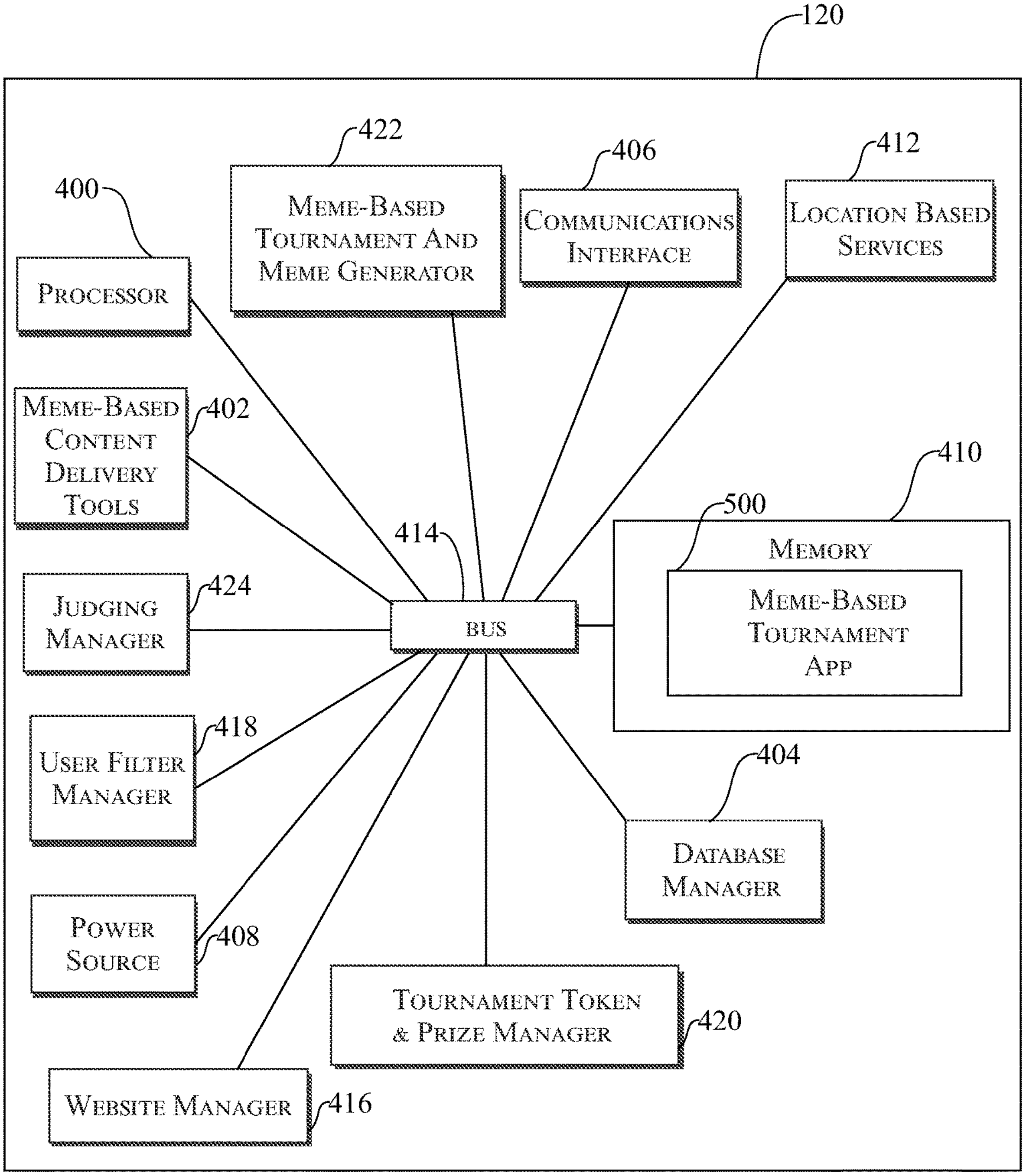
FIG. 4 presents an illustrative meme-based tournament platform for delivery of the meme-based tournament through the meme-based tournament system of FIG. 1 in accordance with an embodiment.

Turning our attention to FIG. 4, an illustrative configuration for the meme-based tournament platform 120 (see, FIG. 1) is shown for deployment of the meme-based tournament herein using the architecture of the meme-based tournament system 100 in accordance with an embodiment. As shown, the meme-based tournament platform 120 comprises processor 400 for executing program code (e.g., meme-based tournament system app 500) and communications interface 406 for managing communications to and from the meme-based tournament platform 120, memory 410 for storing program code and data, and power source 408 for powering the meme-based tournament platform 120. The memory 410 is coupled to the bus 414 for storing computer-readable instructions to be executed by the processor 400 (e.g., meme-based tournament system app 500) in a well-known manner. Power source 408 provides power to the meme-based tournament platform in a well-known manner. Database manager 404 and meme-based tournament content delivery tools 402 are used to manage the delivery and storage of content, data, and other information in the meme-based tournament database(s) 124 and across third party content providers in a well-known manner. As will be discussed in greater detail herein below, the meme-based tournament system app 500 when executed by the processor 400 will enable access to the user (e.g., player 1 110-1 and/or sponsor 1 118-1) to the meme-based tournament system 100 for delivery of the meme-based tournament and associated operations herein. In this way, the execution of the meme-based tournament system app 500 allows the individual players to enter their individual memes in meme-based tournaments and provides tournament sponsors with the ability to search the individual player profiles 128 to determine the type of tournaments to sponsor Location-based service tools 412 facilitate the delivery of location-based services (e.g., OPS tracking) on user device 116 thereby allowing for the location identification of individual players in accordance with the disclosed embodiments herein.

Meme-based tournament and meme generator 422 handles the formation and management of the individual meme-based tournaments (e.g., the meme-based tournament 200) and the creation and management of memes in conjunction with the meme-based tournament app 500. For example, the meme-based tournament generator 422 may define a tournament with the following parameters: (i) theme. Types of Headaches tournament; (see, e.g., https://imgflip.com/memetemplate/119215120/Types-of-Headaches-meme); (ii) memes: a defined meme set for players to select from; (iii) entry fee: 200 credits for a 32-player tournament, and (iv) prizes: first place prize is $20 e-gift card, and second place prize is a $10 e-gift card. In accordance with an embodiment, in the event certain tournament themes may prove controversial or divisive, the meme-based tournament generator 422 may be configured to separate such themes in accordance with their filters 136. To be clear, the principles of the disclosed embodiments apply equally to any type of tournament format that a sponsor desires to offer to players having attributes that include, but are not limited to, size, entry fee, prize structure, topic/theme, and tags, as discussed herein above. Further, the meme-based tournament platform 120 may have access to a plethora of content to formulate the meme-based tournaments such as politics, sports, entertainment, current events, etc.

Judging manager 424 manages the judges and associated operations involved in the meme-based tournaments and their judging activities. In accordance with an embodiment, users of the meme-based tournament platform 120 are invited to serve as judges, on a fully anonymous basis, for the individual matches associated with a particular meme-based tournament. These users will have their respective filters 136 set to align with the specific tournament topic/theme for which they are judging. For example, player 110-1 may be serving as a judge and their respective filter 136 may be set to judge only politically themed meme-based tournaments. The management of such filters being performed by the user filter manager 418 in accordance with the embodiment. Further, the judging manager 424 will also aggregate users that have similar filter settings and invite user from the aggregated pool to judge specific meme-based tournaments. Judging manager 424 will further coordinate the distribution of judges and enforce defined judging guidelines and judging criteria. For example, each judge that is judging a particular meme-based tournament will be given a defined time limit (e.g., 30 seconds) to judge a particular match between individual memes (e.g., memo 202-1 and 202-2 in round 1 204). If the judge does not complete the judging task within the defined time limit, then judging manager 424 may skip them for a next round of that tournament or ban them from serving as judge for a period of time (e.g., 30 days). In certain cases, for example a tournament sponsored by a specific company, there may be specific judging criteria that needs to be applied by the judges in judging the memes. In other cases, the judges will be left to use their own subjective criteria in judging the memes. Illustratively, the judges are not aware of the tournament topic, the players and their association with their memes and/or the round of the tournament that they are judging. In this way, cheating and collusion among judges is mitigated. In accordance with an embodiment, judges will earn token credits for judging memes. The management of the token credits awarded and distributed is managed by tournament token and prize manager 420. In accordance with an embodiment, tokens may be earned for a wide variety of items such as new player registrations, survey completion, viewing advertisements, judging memes, players advancing their memo in a tournament, and new player referrals, to name just a few. In turn, the earned tokens may be redeemed by a player to cover entry fees for a meme-based tournament they wish to participate in as also managed by the tournament token and prize manager 420. In accordance with an embodiment, a particular sponsor of the meme-based tournament may provide their own prizes other than (or in addition to) the default e-gift card prizes awarded by the meme-based tournament platform 120. These sponsor-provided prizes can be anything of value, included but not limited to e-gift cards, cash prizes, physical prizes, etc. If the sponsor wants to use the system to deliver prizes, the sponsor can provide funds to the system in the form of a credit card, wire/ACH transfer, etc. Sponsors may provide their own judges for the meme-based tournaments, instead of the default anonymous users on the platform. This third-party sponsor may provide a credit card that is linked to the meme-based tournament platform 120 and the credit card accumulated balance from the actual prizes awarded will be paid by the meme-based tournament platform 120 using the revenues generated and collected from the meme-based tournaments executed on the meme-based tournament platform 120.

In a further embodiment, the meme-based tournament executed by the meme-based tournament platform 120, by and through the meme-based tournament system app 500, may also include accessing and interfacing with a variety of third-party websites using website manager 416 for procuring information and data that can be used in the meme-based tournament system 100. For example, the player 1 110-1 may direct the sponsor 1 118-1 to their social media profile (e.g., on one of the social media services 126) established on a third-party provider platform. Illustratively, such websites in the context of the principles of the embodiments hereunder allow for access of the player profiles 140 by the sponsor for purposes of developing and sponsoring tournaments directed to a particular player group. The term "website" in the context herein is used in a conventional and broadest sense and is located on at least one server containing web pages stored thereon and is operational in a 24-hour/7-day typical fashion. As shown in the meme-based tournament system 100, the plurality of users may alternatively utilize the well-known internet 122 for access to meme-based tournament system 100 by and through the user device 116 and the meme-based tournament platform 120 in a well-understood fashion. Meme-based tournament content delivery tools 402 are used to manage and deliver a variety of information content received (e.g., from the third-party content providers 114) and/or transmitted by the meme-based tournament system app 500. For example, as detailed herein, a player, in accordance with the principles of the disclosed embodiments, will be establishing at least one player profile (i.e., one of the player profiles 140) that may contain a variety of information including but not limited to information specific to one or more filters 136 that are useful in determining the types of meme-based tournaments this player will be interested in competing.

The communications interface 406 is used to facilitate communications across the communications links 128 (see, FIG. 1) with the meme-based tournament cloud 102 in a well understand fashion. This may take the form, for example, of a wide area network connection that communicatively couples the meme-based tournament platform 120 with the access points 106 (see, FIG. 1) which may be a cellular communications service. Similarly, communications managed by the communications interface 406 may take the form, for example, of a local Wi-Fi network interface or Ethernet interface the communicatively couples the meme-based tournament platform 120 with the Internet 122, LAN 112 and ultimately the user device 116. In the instant embodiment, the meme-based tournament system app 500 and/or the communications interface 406 may include a communications stack for facilitating communications over the respective communications links 128. Electronic communications by and through meme-based tournament system 100 between the various systems, networks, devices, users, entities, and/or individuals are facilitated by the communications links 128 in accordance with any number of well-known communications protocols and methods (e.g., wireless communications).

Figure 5:
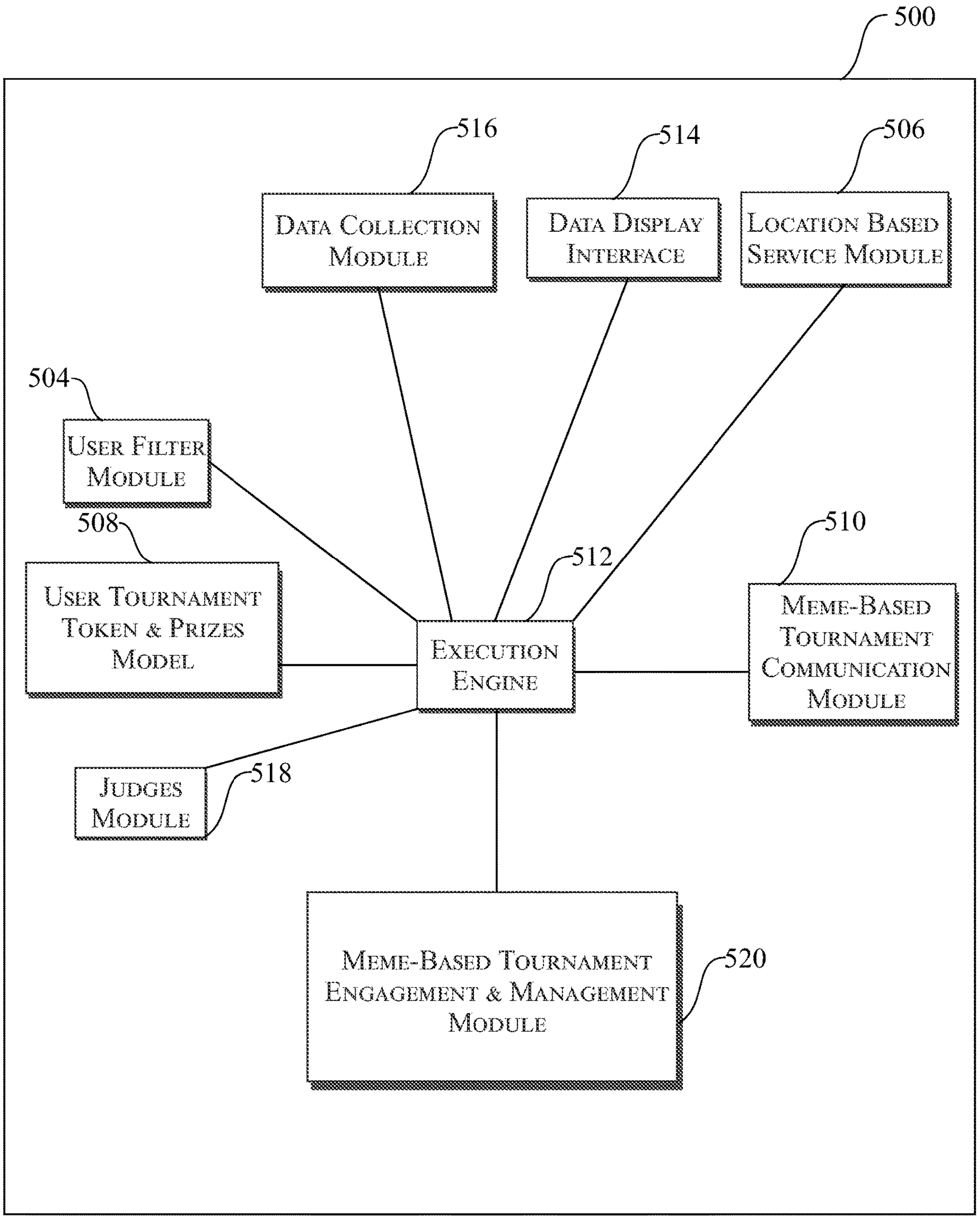
FIG. 5 presents an illustrative architecture for a meme-based tournament system app in accordance with an embodiment.

Turning our attention to FIG. 5, an illustrative architecture for the operation of the meme-based tournament system app 500 is presented in accordance with an embodiment. As will be appreciated, the illustrative meme-based tournament system app 500 may be used in conjunction with the meme-based tournament hosting platform 120 and/or the user device 116 for launching and executing the meme-based tournament system app 500 and its associated operations. As shown, the illustrative architecture for the operation of the meme-based tournament system app 500 provides several interfaces and engines used to perform a variety of functions such as the collection, aggregation, manipulation, processing, analyzing and display of applicable information and data that are useful to deliver the meme-based tournaments of the disclosed embodiments. More particularly, data display interface 514 and the meme-based tournament communications module 510 are used to facilitate the input/output and display of electronic data and other information (e.g., a graphical user interface) to, illustratively, the users (e.g., player 1 110-1 through player N 110-N and/or sponsor 1 118-1 through sponsor N 118-N) employing the user device 116 (e.g., a touch screen of the mobile device 300) and executing the meme-based tournament system app 500.

The data collection module 516 facilitates meme-based tournament information collection from the plurality of users including but not limited to the player profiles 140, third party information providers and/or social media services (e.g., the social media services 126) The data collection interface 416 may also be used to collect a variety of meme-based tournament information (e.g. personal information, photographs, videos, etc.) information from other virtual and/or electronic sources accessible via the internet 122 and individual third-party websites hosted thereon. In this way, the set of meme-based tournament information comprises information and other data specific to one or more players and/or one or more sponsors.

Execution engine 512 may be employed to deliver the meme-based tournament herein through the execution of the meme-based tournament system app 500. In such delivery, the execution engine 512 will operate and execute, as further detailed herein below, with at least the following program modules: user filter module 504, location-based services module 506, user tournament token and prizes module 508, meme-based tournament communication module 510, judges module 518, and meme-based tournament engagement and management module 520. In an embodiment, the meme-based tournament engagement and management module 520, working in conjunction with the meme-based tournament and meme generator 422, handles the formation and management of the individual meme-based tournaments (e.g., the meme-based tournament 200) and the creation and management of memes (e.g., meme 202-1 through meme 202-16). Further, the meme-based tournament engagement and management module 520 will also facilitate the generation of meme-based tournaments by sponsors and execution thereof on the meme-based tournament platform 120 as detailed herein above. Illustratively, the website manager 416 may be used to administer such tournament sponsorship and invite players to participate in a specific tournament. The location-based services module 506 provides for the delivery of location-based services in order for the geographic locations of the engaged users to be identified and displayed (e.g., GPS locations). To facilitate direct communication between individual users, the meme-based tournament communications module 510 will allow for individual communication and messaging of information germane to a particular meme-based tournament opportunity and allow for other user-to-user communications in a well understood fashion.

Judges modules 518, in conjunction with the judging manager 424, manages the judges involved in the meme-based tournaments and their judging activities. In accordance with an embodiment, users of the meme-based tournament app 500 and the meme-based tournament platform 120 are invited to serve as judges for the individual matches associated with a particular meme-based tournament. All judging is performed on a complete anonymous basis. These users will have their respective filters 136 set to align with the specific tournament topic/theme for which they are judging. For example, player 110-1 may be serving as a judge and their respective filter 136 may be set to judge only politically themed meme-based tournaments. The management of such filters being performed by the user filter module 514, in conjunction with the user filter manager 418, in accordance with the embodiment. Further, judges module 518, in conjunction with the judging manager 424, will also aggregate users that have similar filter settings and invite user from the aggregate pool to judge specific meme-based tournaments. Judging manager 518 will further coordinate the distribution of judges and enforce defined judging guidelines, as previously detailed herein above. The management of the token credits awarded and distributed is managed by user tournament token and prizes module 508. As detailed previously, tokens may be earned for a wide variety of items such as new player registrations, survey completion, viewing advertisements, judging memes, player advancing their meme in a tournament, and new player referrals, to name just a few. In turn, the earned tokens may be redeemed a player to cover future meme-based tournament entry fees. Illustratively, in accordance with the disclosed embodiments, each tournament (i) is based a fixed theme, topic, image and/or video, (ii) has anonymous judges, and each judge earn in-app currency for their judging efforts; (iii) tournament contestants that advance in the rounds of any given meme-based tournament will earn in-app currency the further they advance their meme in any particular tournament; and (iv) will award some form of physical prize (e.g., digital gift cards).

Figure 6:
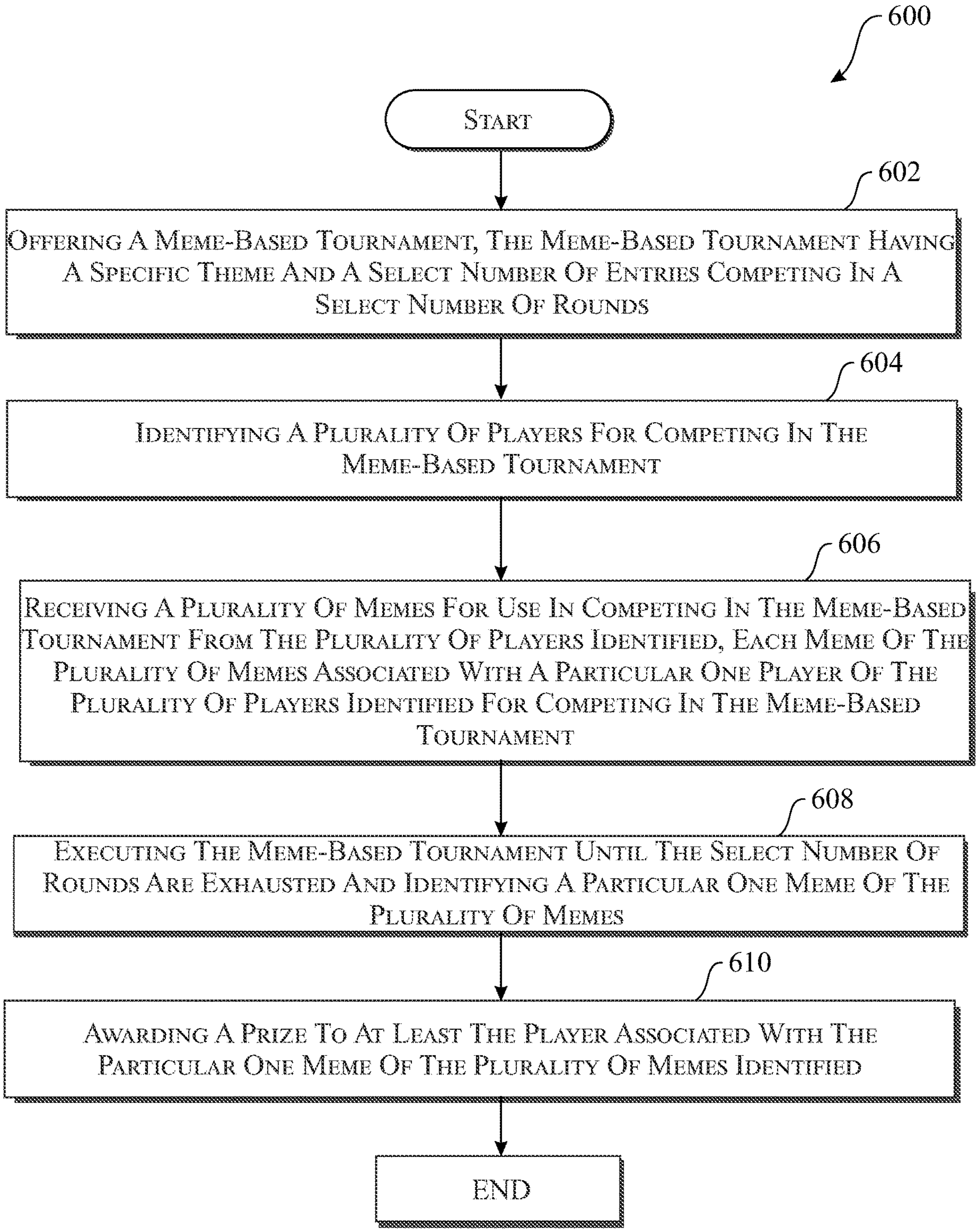
FIG. 6 presents a flowchart of illustrative operations for executing a meme-based tournament through the meme-based tournament system of FIG. 1 and the illustrative meme-based tournament system app architecture of FIG. 4 in accordance with an embodiment.

Turning our attention to FIG. 6, a flowchart of illustrative operations 600 is presented for executing a meme-based tournament through the meme-based tournament system of FIG. 1 and the illustrative meme-based tournament system app architecture of FIG. 4 in accordance with an embodiment. In accordance with FIG. 6, the illustrative operations 600 comprise, at step 602, offering a meme-based tournament, the meme-based tournament having a specific theme and a select number of entries competing in a select number of rounds. At step 604, identifying a plurality of players for competing in the meme-based tournament and, at step 606, receiving a plurality of memes for use in competing in the meme-based tournament from the plurality of players identified, each meme of the plurality of memes associated with a particular one player of the plurality of players identified for competing in the meme-based tournament. Executing, at step 608, the meme-based tournament until the select number of rounds are exhausted and identifying a particular one meme of the plurality of memes. Illustratively, the execution of the meme-based tournament includes a plurality of judges that judge the individual rounds and vote for their favorite meme thereby advancing memos until a single winning meme is identified. More particularly, in an embodiment, executing the meme-based tournament until the select number of rounds are exhausted and identifying a particular one meme of the plurality of memes the executing the meme-based tournament including a judging, by a plurality of judges on an anonymous basis, of the plurality of memes for use in competing in the meme-based tournament resulting in the identifying of the particular one meme of the plurality of memes. Then, at step 610, awarding a prize to at least the player associated with the particular one meme of the plurality of memes identified.

Figure 7A:
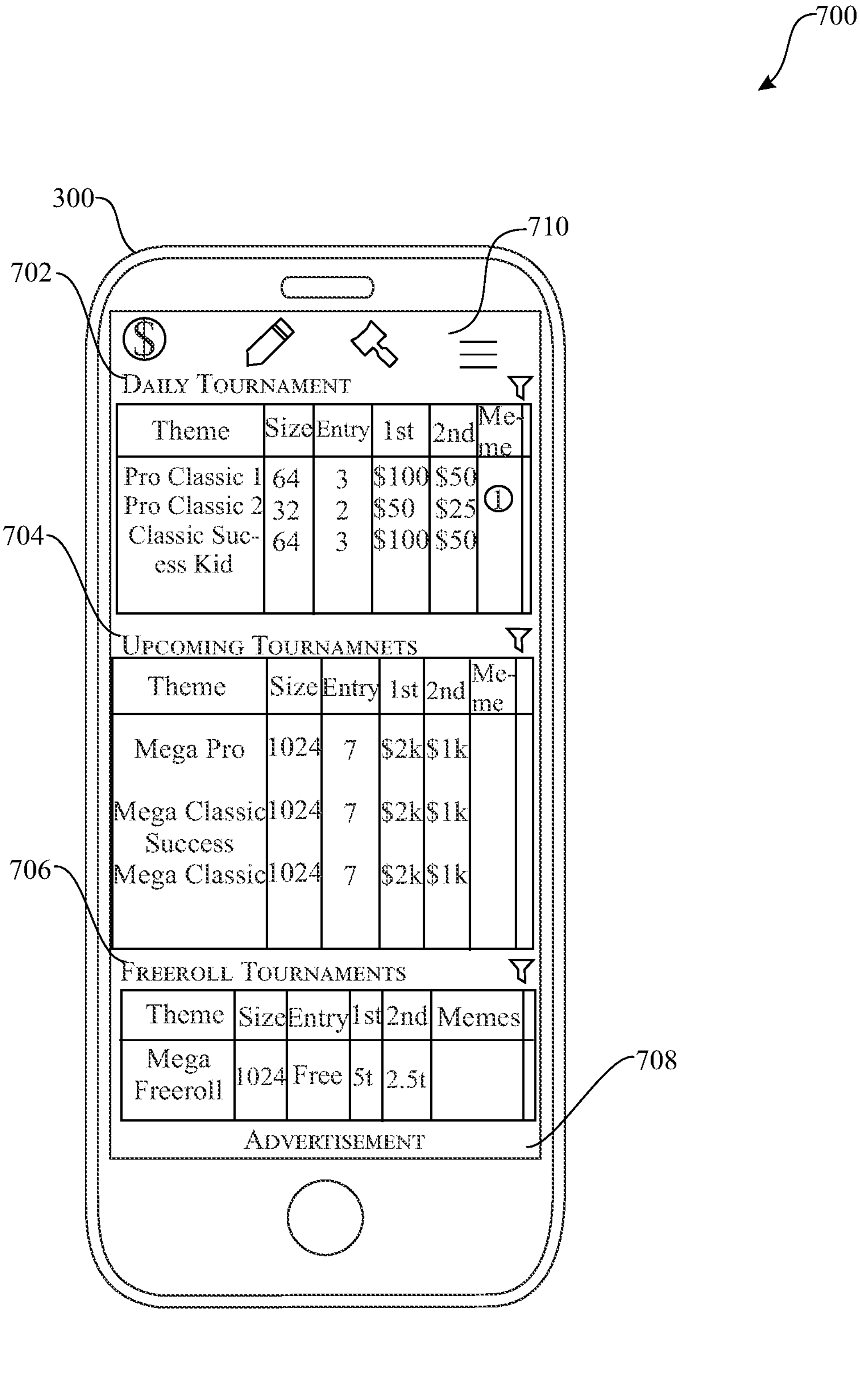
FIGS. 7A and 7B present an illustrative player user device configured for use with the meme-based tournament system of FIG. 1 in accordance with an embodiment.
Figure 7B:
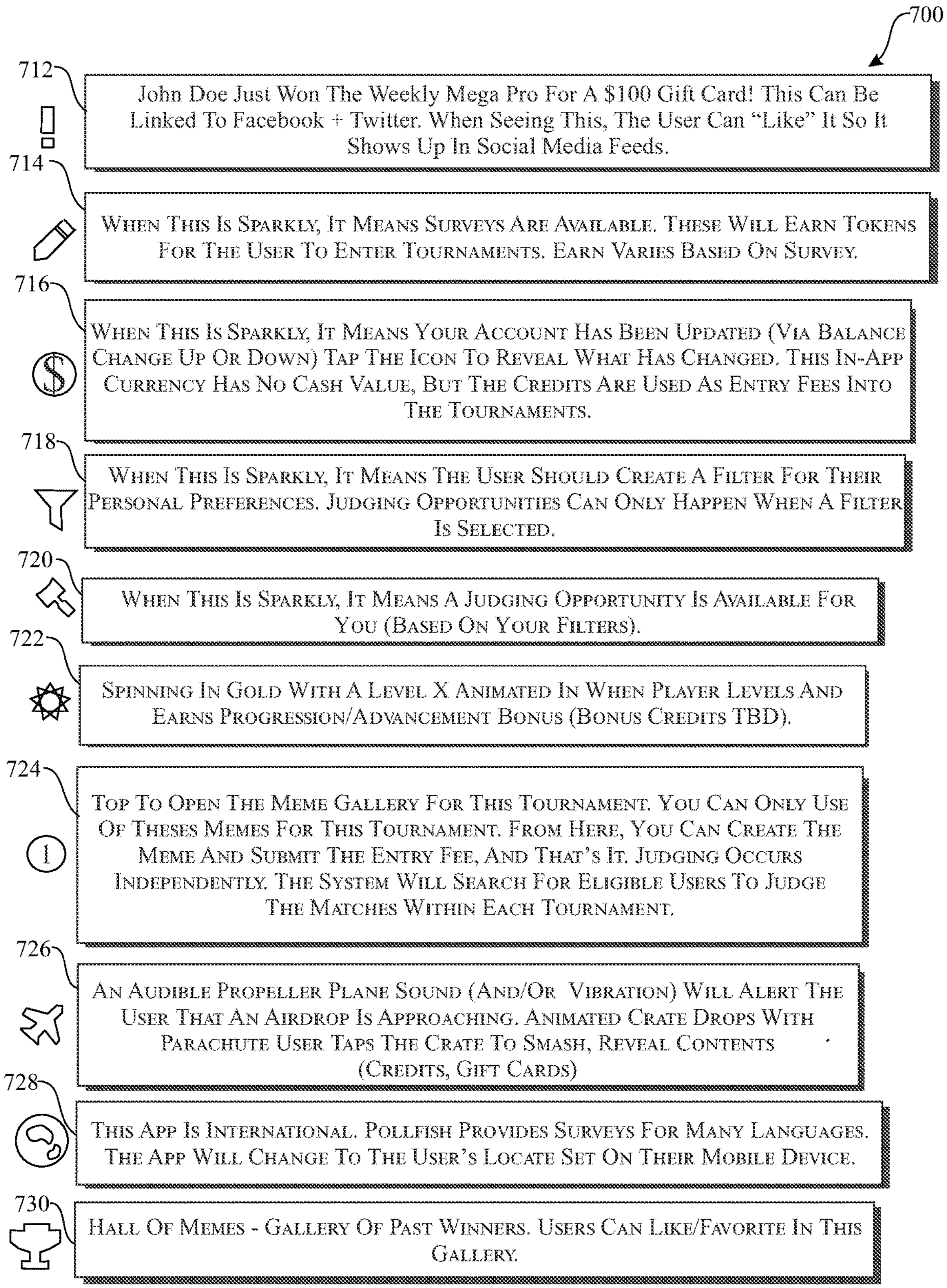

Turning our attention to FIGS. 7A and 7B, an illustrative player user device configuration 700 is presented for use with the meme-based tournament system of FIG. 1 in accordance with an embodiment. As shown in FIG. 7A, in main display area 710 of the user device 300 there are daily tournaments 702, upcoming tournaments 704 and freeroll tournaments 706 being sponsored and ready for selection by the user (e.g., player 110-1) of the user device 300. As shown, advertisement banners 708 are displayed that serve as another revenue generating source for the provider of the meme-based tournament platform 120. A variety of icons, as shown in FIG. 7B, may be used in conjunction with the main display area 710 to enable various features of the meme-based tournament app 500, executing on the user device as detailed above, for use by the user. Illustratively, icon 712 may be used as a "pop up" notification that notifies the user of a particular winner of a recently completed meme-based tournament. Icon 714 may be used to indicate that a user survey is available for completing and earning tokens, and icon 716 may be used to signify that a user's account balance has undergone a recent updating. Icon 718 may be used to facilitate the creating of a filter (e.g., one of the filters 136) that are important for a variety of features of the meme-based tournament app 500 including but not limited to a user serving as a judge, as detailed herein above. Icon 720 is indicative of a judging opportunity becoming available and icon 722 is indicative of a player reaching a certain certification level based on play. Icon 724 may be used for creating and/or selecting a particular meme for one of the meme-based tournaments being sponsored. Icon 726 may provide a type of audible notification to a user indicative of a certain event or task, and icon 728 may be used conduct player surveys using any well-known survey tool. Icon 730 is an indication that a particular player has achieved "hall of fame" status in view of their tournament accomplishments.

Figure 8:
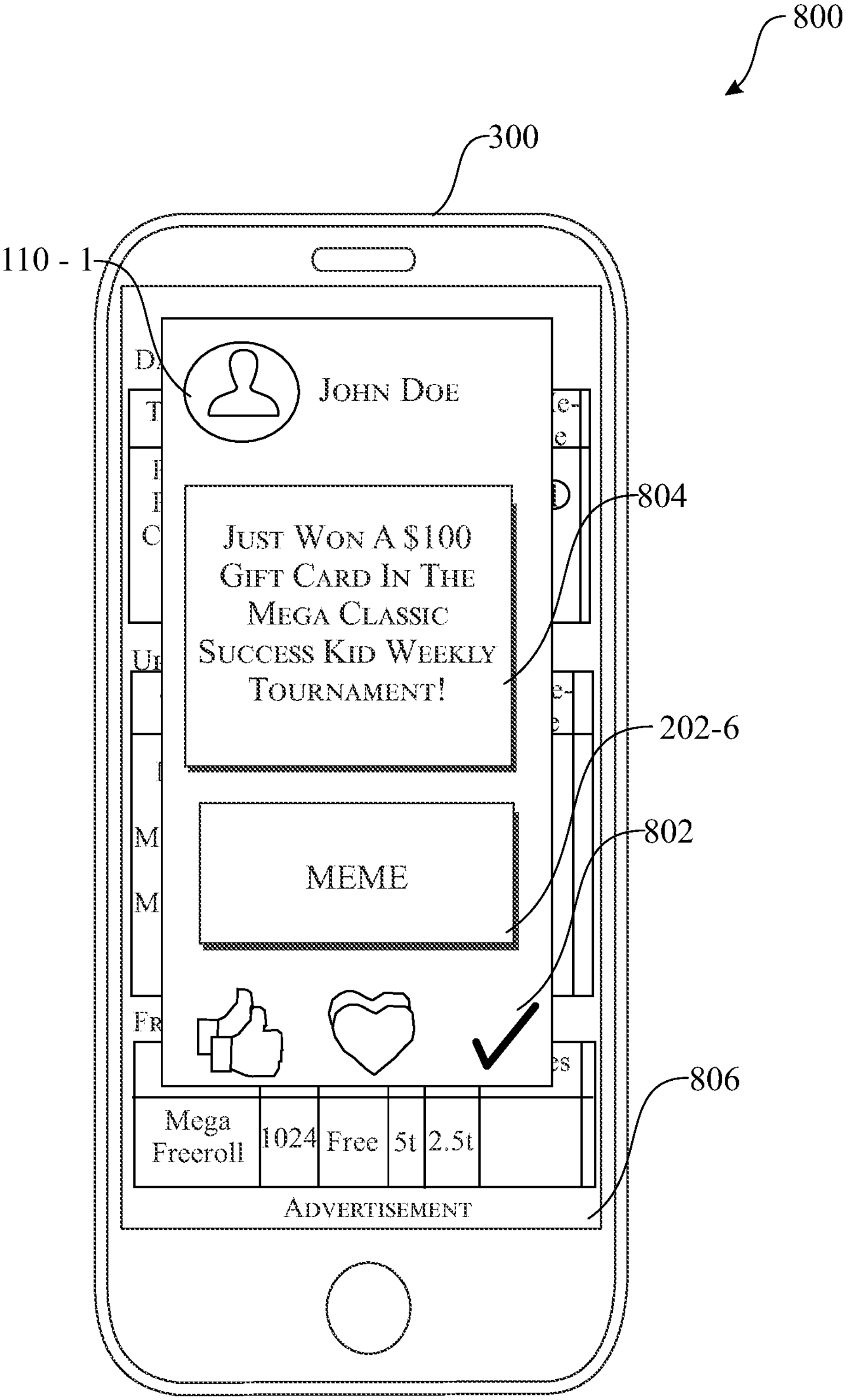
FIG. 8 presents an illustrative user device configured for awarding prizes with the meme-based tournament system of FIG. 1 in accordance with an embodiment.

FIG. 8 shows an illustrative player user device configuration 800 for awarding prizes with the meme-based tournament system of FIG. 1 in accordance with an embodiment. As shown, in main display area 802 of the user device 300 this device is associated with the player 110-1 who has just completed competing in a particular tournament (i.e., the Mega Classic Success Kid Weekly Tournament) and was awarded a $100 gift card, as shown in main display area 804. The winning meme was meme 202-6 associated with the player 101-1. As shown, advertisement banners 806 are displayed that serve as another revenue generating source for the provider of the meme-based tournament platform 120.

Figure 9:
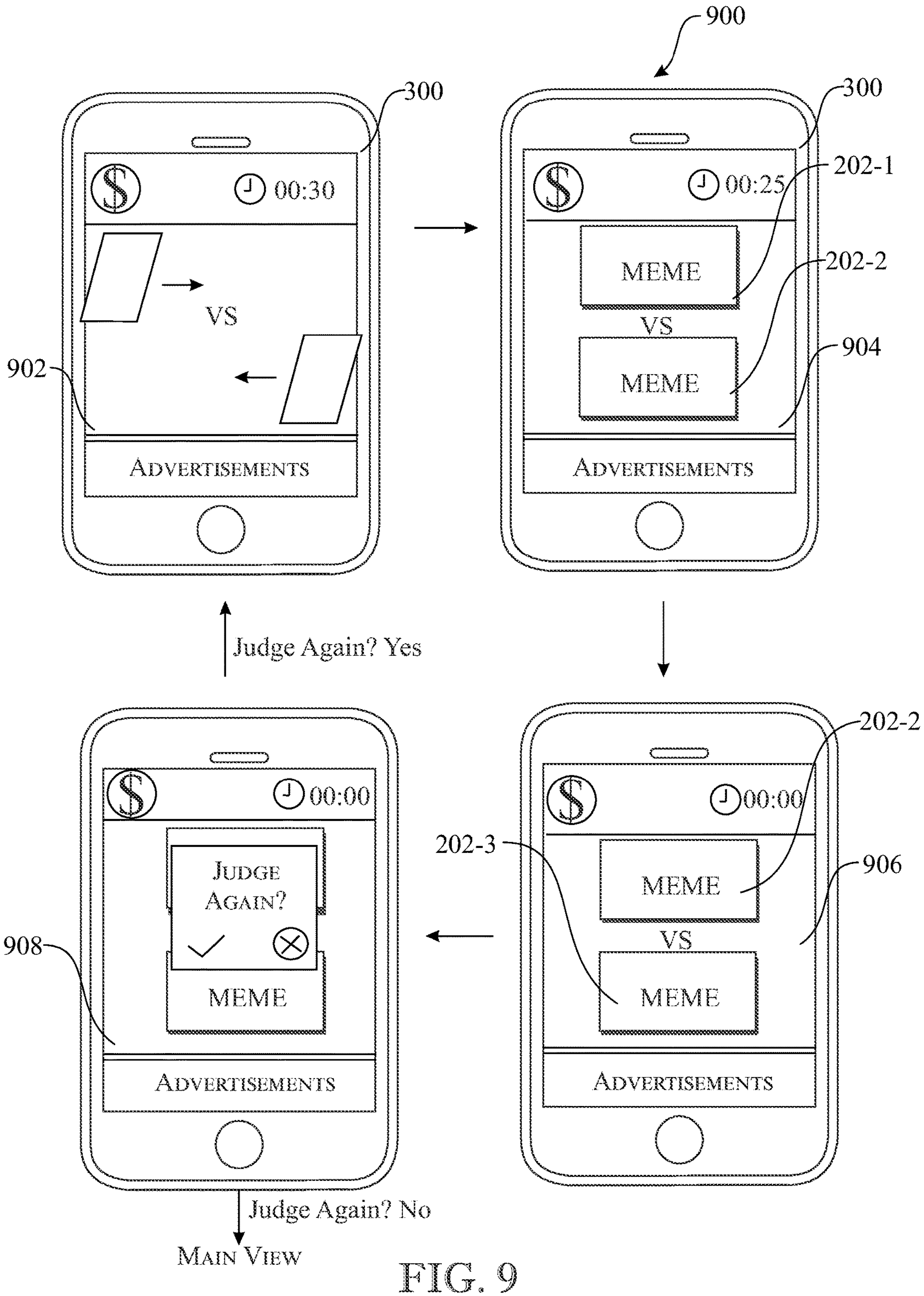
FIG. 9 presents an illustrative judge user device configured for use with the meme-based tournament system of FIG. 1 in accordance with an embodiment.

FIG. 9 presents an illustrative judge user device 300 configuration sequence 900 for use with the meme-based tournament system of FIG. 1 in accordance with an embodiment. Main display area 902 shows an unpopulated meme-based tournament bracket awaiting population by the respective memos, and main display area 904 shows such bracket after being populated with the meme 202-1 and the meme 202-2 that will be judged accordingly by the user associated with the user device 300. As shown by main display area 906, meme 202-2 has advanced to the next round to compete against meme 202-3 and that round is now ready for judging by the user of the user device 300. Main display area 908 shows an inquiry as to whether user of the user device 300 want to continue judging and, if so, then they are provided another meme match to judge. Otherwise, they are returned to the main view of the meme-based tournament app 500.

FIG. 10 presents an illustrative meme-based tournament entry-fee and prize configuration 1000 for use with the meme-based tournament system of FIG. 1 in accordance with an embodiment. In particular, meme-based tournament ledger 1002 will maintain information such as tournament size 1004, entry fee 1006. $1^{st}$ place 1008, $2^{nd}$ place 1010, $3^{rd}$ place 1012, $4^{th}$ place 1014, and the various prizes 1016.

As noted above, in some embodiments the method or methods described above may be executed or carried out by a computing system including a tangible computer-readable storage medium, also described herein as a storage machine, that holds machine-readable instructions executable by a logic machine (i.e., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method (see, e.g., FIG. 6) and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high-level representation of some of the components of such a computer is for illustrative purposes.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method comprising:

under control of a meme-based tournament platform comprising at least a processor and a memory configured for executing a computer program that when executed, cause the processor to perform operations comprising:

scanning one or more filters and matching the one or more filters scanned with a plurality of current events and/or topics, and based on the matching, generating a plurality of themes for a meme-based tournament:

selecting a specific theme from the plurality of themes generated;

creating the meme-based tournament based on the specific theme selected, the meme-based tournament having the specific theme and a select number of entries competing in a select number of rounds;

identifying a plurality of players for competing in the meme-based tournament and filling the select number of entries;

receiving a plurality of memes for use in competing in the meme-based tournament from the plurality of players identified, each meme of the plurality of memes associated with a particular one player of the plurality of players identified for competing in the meme-based tournament;

executing the meme-based tournament through the plurality of memes until the select number of rounds are exhausted and identifying a particular one meme of the plurality of memes, the executing the meme-based tournament including a judging, by a plurality of judges on an anonymous basis, of the plurality of memes for use in competing in the meme-based tournament resulting in the identifying of the particular one meme of the plurality of memes; and awarding a prize to at least the particular one player associated with the particular one mere of the plurality of memos identified.

2. The method of claim 1, wherein the operations performed by the processor further comprise separating the plurality of mere-based tournament themes generated into two or more groups based on whether a particular meme-based tournament theme may be categorized as controversial or divisive to a particular audience or not.

3. The method of claim 1, wherein the prize awarded has a monetary value.

4. The method of claim 1, wherein the operations performed by the processor further comprise:

awarding one or more tokens, earned through the memo-based tournament platform, to at least one player of the plurality of players identified for the competing in the meme-based tournament executed.

5. The method of claim 1, wherein the operations performed by the processor further comprise:

receiving a designation for the prize awarded comprising at least a prize type and a prize value.

6. The method of claim 1, wherein the mere-based tournament is a knockout-style tournament comprising a bracket-style configuration having a plurality of brackets.

7. The method of claim 6, wherein the bracket-style configuration is one of: sixteen (16) players, thirty-two (32) players, sixty-four (64) players, one hundred twenty-eight (128) players, two hundred fifty-six (256) players, five hundred twelve (512) players, one thousand twenty-four (1024) players, and two thousand forty-eight (2048) players.

8. The method of claim 6, wherein each judge of the plurality of judges is given a defined time limit for the judging of a particular match between individual memes competing in the meme-based tournament in a particular bracket of the plurality of brackets.

9. The method of claim 1, wherein the operations performed by the processor further comprise:

receiving a specific time designation for the executing of the memo-based tournament.

10. The method of claim 1, wherein each judge of the plurality of judges applies a specific judging criteria in the judging of the plurality of metrics.

11. The method of claim 1, wherein the operations performed b the processor further comprise:

hosting, by an individual user using the meme-based tournament platform, the meme-based tournament selected.

12. The method of claim 11, wherein the operations performed by the processor further comprise:

executing a purchasing transaction by which the individual user purchases a plurality of tournament host tokens.

13. The method of claim 12, wherein the operations performed by the processor further comprise:

receiving, by the memo-based tournament platform, at least one tournament host token from the individual user as payment for the creating, offering, and executing of the meme-based tournament.

14. The method of claim 1, wherein the operations performed by the processor further comprise:

defining the meme-based tournament as a function of at least a tournament size, the specific theme, a defined meme set for selection by the plurality of players, an entry fee, and a prize structure.

15. The method of claim 14, wherein the theme is one of politics, sports, entertainment, and current events.

16. The method of claim 1, wherein the operations performed by the processor further comprise method further comprises:

selecting particular ones of a plurality of individual users associated with the meme-based tournament platform to serve as the plurality of judges; and inviting the particular ones of the plurality of individual users selected to serve as the plurality of judges.

17. A method comprising:

under control a meme-based tournament platform comprising at least a processor and a memory configured for executing a computer program that when executed, cause the processor to perform operations comprising:

scanning one or more filters and matching the one or more filters scanned with a plurality of current events and/or topics, and based on the matching, generating a plurality of themes for a meme-based tournament;

selecting a specific theme from the plurality of themes generated;

creating the meme-based tournament based on the specific theme selected, the meme-based tournament having the specific theme and a select number of entries competing in a select number of rounds;

receiving a designation for a prize associated with the meme-based tournament offered to be awarded comprising at least a prize type and a prize value;

identifying a plurality of players for competing in the meme-based tournament and filling the select number of entries;

receiving a plurality of memes for use in competing in the meme-based tournament from the plurality of players identified, each meme of the plurality of memes associated with a particular one player of the plurality of players identified for competing in the mane-based tournament;

executing the meme-based tournament through the plurality of memes until the select number of rounds are exhausted and identifying a particular one meme of the plurality of memes, the executing the meme-based tournament including a judging, by a plurality of judges on an anonymous basis, of the plurality of memes for use in competing in the meme-based tournament resulting in the identifying of the particular one meme of the plurality of memes, wherein each judge of the plurality of judges applies a specific judging criteria in the judging of the plurality of memes; and awarding the prize to at least the particular one player associated with the particular one meme of the plurality of memes identified.

18. The method claim 17, wherein the meme-based tournament is a knockout-style tournament comprising a bracket-style configuration having a plurality of brackets, and the bracket-style configuration is one of: sixteen (16) players, thirty-two (32) players, sixty-four (64) players, one hundred twenty-eight (128) players, two hundred fifty-six (256) players, five hundred twelve (512) players, one thousand twenty-four (1024) players, and two thousand forty-eight (2048) players.

19. The method of claim 17, wherein the operations performed by the processor further comprise method further comprises:

selecting particular ones of a plurality of individual users associated with the meme-based tournament platform to serve as the plurality of judges; and inviting the particular ones of the plurality of individual users selected to serve as the plurality of judges.

20. A method comprising:

under control a meme-based tournament platform comprising at least a processor and a memory configured for executing a computer program that when executed, cause the processor to perform operations comprising:

scanning one or more filters and matching the one or more filters scanned with a plurality of current events and/or topics, and based on the matching, generating a plurality of themes for a meme-based tournament, selecting a specific theme from the plurality of themes generated;

creating the meme-based tournament based on the specific theme selected, the meme-based tournament having the specific theme and a select number of entries competing in a select number of rounds, wherein the meme-based tournament is a knockout-style tournament comprising a bracket-style configuration having a plurality of brackets;

receiving a designation for a prize associated with the meme-based tournament offered to be awarded comprising at least a prize type and a prize value;

identifying a plurality of players for competing in the meme-based tournament and filling the select number of entries;

receiving a plurality of memes for use in competing in the meme-based tournament from the plurality of players identified, each meme of the plurality of memes associated with a particular one player of the plurality of players identified for competing in the meme-based tournament;

selecting particular ones of a plurality of individual users associated with a meme-based tournament platform to serve as a plurality of judges;

inviting the particular ones of the plurality of individual users selected to serve as the plurality of judges;

executing the meme-based tournament through the plurality of memes until the select number of rounds are exhausted and identifying a particular one meme of the plurality of memes, the executing the meme-based tournament including a judging, by the plurality of judges on an anonymous basis, of the plurality of memes for use in competing in the meme-based tournament resulting in the identifying of the particular one meme of the plurality of memes, wherein each judge of the plurality of judges applies a specific judging criteria in the judging of the plurality of memes and is given a defined time limit for the judging of a particular match between individual memes competing in the meme-based tournament in a particular bracket of the plurality of brackets;

awarding one or more tokens, earned through the meme-based tournament platform, to at least one player of the plurality of players identified for the competing in the mere-based tournament executed; and awarding the prize to at least the particular one player associated with the particular one of meme of the plurality of memes identified.

* * * * *